(12) United States Patent
Bigorra Llosas et al.

(10) Patent No.: US 8,148,454 B2
(45) Date of Patent: Apr. 3, 2012

(54) USE OF GLYCEROL ACETALS

(75) Inventors: Joaquin Bigorra Llosas, Sabadell (ES); Setsuo Sato, Sao Paulo (BR); Ramiro Carielo Bueno, São Paulo (BR); Elisabet Graupera, Sabadell (ES)

(73) Assignee: Cognis IP Management GmbH, Duesseldorf (DE)

( * ) Notice: Subject to any disclaimer, the term of this patent is extended or adjusted under 35 U.S.C. 154(b) by 0 days.

(21) Appl. No.: 12/738,850

(22) PCT Filed: Oct. 11, 2008

(86) PCT No.: PCT/EP2008/008620
§ 371 (c)(1),
(2), (4) Date: Apr. 20, 2010

(87) PCT Pub. No.: WO2009/049840
PCT Pub. Date: Apr. 23, 2009

(65) Prior Publication Data
US 2010/0216926 A1    Aug. 26, 2010

(30) Foreign Application Priority Data
Oct. 20, 2007   (EP) .................................. 07020568

(51) Int. Cl.
*C08K 5/06* (2006.01)

(52) U.S. Cl. ................. 524/377; 106/287.2; 106/287.26

(58) Field of Classification Search .................. 524/377; 106/287.2, 287.26
See application file for complete search history.

(56) References Cited

U.S. PATENT DOCUMENTS

| 1,934,309 | A | * | 11/1933 | Hoover .......................... 549/448 |
| 2,227,975 | A | * | 1/1941 | Kenyon et al. ................... 525/56 |
| 5,932,229 | A | | 8/1999 | Ptchelintsev et al. |
| 2003/0091514 | A1 | | 5/2003 | Stier |
| 2003/0215498 | A1 | | 11/2003 | Harland |
| 2006/0024246 | A1 | * | 2/2006 | Maitra et al. ..................... 424/49 |
| 2010/0137480 | A1 | | 6/2010 | Denilson et al. |

FOREIGN PATENT DOCUMENTS

| EP | 1312354 A1 | 5/2003 |
| EP | 1437049 A1 | 7/2004 |
| RO | 63233 | 2/1978 |
| WO | 01/34753 A1 | 5/2001 |
| WO | 2005/030141 A2 | 4/2005 |
| WO | 2008/096255 A2 | 8/2008 |

OTHER PUBLICATIONS

"Filmbildehilfsmittel" H.J. Kok, Lehrbuch der Lacke und Beschichtungen 2. Edition., Bd. 4, 2007. pp. 425-432.
"Wachse" Lacke und Druckfarben, Dr. U. Zorl, Hrsg., Georg Thieme Verl., Stuttgart, New York (1998) 4 pages.
"English Translation of RO 63233, 10 pages", Feb. 1978.

* cited by examiner

*Primary Examiner* — Kriellion Sanders
(74) *Attorney, Agent, or Firm* — Diehl Servilla LLC

(57) ABSTRACT

Disclosed is the use of glycerol acetals as coalescent agents and/or solvents for making lacquers and paints.

5 Claims, No Drawings

USE OF GLYCEROL ACETALS

CROSS REFERENCE TO RELATED APPLICATIONS

This application is the National Phase entry of PCT/EP2008/008620, filed Oct. 11, 2008, which claims priority to EPO patent application number 07020568.7 filed Oct. 20, 2007, which are incorporated herein by reference in their entireties.

FIELD OF THE INVENTION

The present invention is related to the area of lacquers and paint additives and concerns the use of glycerol acetals as green solvents, in particular coalescent agents for said products.

BACKGROUND OF THE INVENTION

The quality of an optimum decorative paint results from a number of components performance that is a part of such formulation. Each element, each raw material is present to impart properties and characteristics to contribute with and modify the results of the final product quality. Certainly, a proper choice may change for example the hiding power, gloss, drying, durability, and including, the cost.

Among the main raw materials that sensitively impact the quality of a basic formulation in decorative paints one finds the coalescent agents. By definition, coalescence means the process through which a cell or latex particle (high molecular weight polymers dispersed in water) approaches themselves, agglutinate, and fuse to build a continued and homogeneous film. After the first step, the evaporation, and under room temperature, some paints can even decrease the film forming temperature (Tg—vitreous transition temperature) and build the expected film with no use of any coalescent. The result, however is extremely soft films that become dirty easily, are hard to be cleaned, and are very little resistant and durable. However, adding a coalescent even under adverse conditions such as low temperatures, high humidity, leads to high quality and performance films. A general and detailed description of the coalescent effect can be found in H. J. Kok, *Filmbildehilfsmittel*, in: H. Kittel (ed.) Lehrbuch der Lacke and Beschichtungen, 2. Edition., Bd. 4, Hrsg. M. Ortelt, S. Hirzel Verl., Stuttgart (2007).

Taking the disadvantages of the state of the art into account it has been the object of the represent invention to provide new coalescent agents/solvents for making lacquers and paints which show compared to the products found in the market
lower Minimum Film Forming Temperature;
higher pendulum hardness of the films, even at low coalescent concentrations;
increased scrub and block resistance of the films,
better gloss;
higher stability also at elevated temperatures; and
at least similar biodegradability.

DETAILED DESCRIPTION OF PREFERRED EMBODIMENTS

The present invention refers to the use of glycerol acetals as coalescent agents and/or solvents for making lacquers and paints.

Surprisingly it has been observed that acetals made from glycerol, in particular glycerol isobutyral meet all the criteria of the profile explained above. Replacing coalescent agents found in the market, as for example butyl glycol or trimethyl butyrate, by the acetals according to the inventions, similar behaviour of the MFFT has been found The films show improved hardness, scrub and block resistance and gloss, also at lower additive concentrations. One can also observe that the gloss of the films are stable even if exposed to higher temperatures over longer periods of time, e.g. 3 days at 60° C. Finally, as example isobutyral acetal shows a biodegradability level of 78, therefore it is considered readily biodegradable Glycerol Acetals and their Manufacture Glycerol acetals may be derived from all kinds of aliphatic or aromatic aldehydes referring to general formula (I),

$$R^1\text{—CHO} \tag{I}$$

in which $R^1$ stands for a linear or branched, saturated or unsaturated aliphatic alkyl radical having 1 to 22, preferably 2 to 6 carbon atoms, or an aromatic ring having 5 to 12, preferably 5 or 6 carbon atoms, optionally containing nitrogen or oxygen atoms replacing one or two carbon atoms in the ring system, and also optionally substituted by one or more hydroxy groups. Examples for suitable aldehydes forming the starting material for the glycerol acetals encompass propianaldehyde, pentanal, isoamylaldehyde, octanal, 2-methylhexyl aldehyde, nonanal, dodecanal, isotridecanal, hexadecanal and octadecanal. The preferred glycerol acetals are those derived from isobutyraldehyde, 2-ethylhexyl aldehyde, furfuryl aldehyde and benzaldehyde having the following formulae:

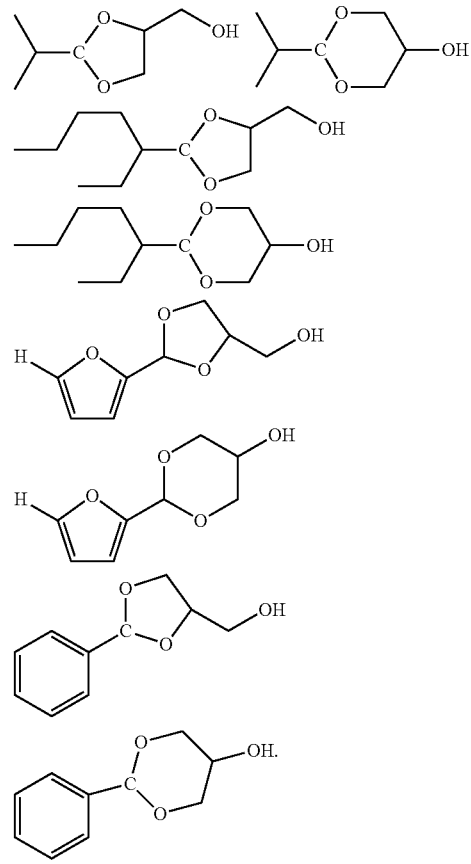

A preferred process for obtaining the glycerol acetals to be used according to the present invention comprises the following essential steps:

(i) glycerol is reacted with the aldehyde component;
(ii) in the absence of organic solvents and
(iii) in the presence of phosphoric acid as catalyst,
(iv) the molar ratio of glycerol to aldehyde(s) being adjusted to a value of 1:1 to 1:1.2 (a ratio of 1:1.1 being particularly preferred).

More particularly, the preferred process for the production of said glycerol acetals is encompasses the reaction of glycerol with one or more of said aldehydes in the absence of organic solvents and in the presence of phosphoric acid as catalyst, the molar ratio of glycerol to aldehyde(s) being adjusted to a value of 1:1 to 1:1.2. In order to avoid ambiguities, it is pointed out that, where the molar ratio of glycerol to aldehydes is mentioned, the singular form "aldehyde" refers to the fact that either a single aldehyde is used while the plural form "aldehydes" refers to the fact that one or more aldehydes is/are used. Accordingly, the glycerol to aldehyde ratio is always understood to be the molar ratio of glycerol to the totality of aldehyde(s). According to the process as described above acetals are obtained in a high yield (at least 95%, based on the glycerol used) showing a gas-chromatographic purity of at least 95% (percentage area GC) without any need for special purification steps, such as filtration or additional distillation. In addition, the products obtained are colourless. The molar ratio of glycerol to aldehydes is preferably adjusted to a value of ca. 1:1.1. Glycerol may be used in pure form or with a water content of up to 20% by weight in the process according to the invention. Water-containing glycerols are available, for example, from the biodiesel process. The process is distinguished by short to moderate reaction times. A time of 3 to 6 hours is generally sufficient for a substantially quantitative conversion. The catalyst used (phosphoric acid) is preferably used in a quantity of 0.1 to 0.8 mol-% (and preferably in a quantity of 0.2 to 0.6 mol-%), based on glycerol. The reaction is typically conducted at temperatures of 40 to 150° C. and preferably at temperatures of 70 to 130° C. In one embodiment, the water of reaction is continuously removed from the reaction mixture, preferably using an apparatus of the Dean Stark type. The reaction is preferably carried out in an inert gas atmosphere, for example under nitrogen. Following this manufacturing routine, the 5- and 6-rings of the particular corresponding acetals (see the above formulae) accumulate in a ratio of ca. 80:20.

INDUSTRIAL APPLICATION

The glycerol acetals have been found useful as coalescent agents for making lacquers and paints to which they typically are added in amounts of from 0.1 to 10, preferably 0.5 to 5 and more preferably 1 to 2% b.w.—calculated on the final composition.

Another object of the present invention relates to lacquers or paints, comprising (a) pigments and/or dyes,
(b) resins,
(c) fillers, and
(d) glycerol acetals.

In addition the products may also contain antifoaming agents, thickening agents and/or associative thickeners, dispersing agents, humectants, organic solvents and the like. More particularly, the products may comprise (a) 5 to 25, preferably 10 to 15% b.w. pigments and/or dyes;
(b) 10 to 50, preferably 30 to 40% b.w. resins;
(c) 5 to 50, preferably 10 to 25% b.w. fillers;
(d) 0.1 to 10, preferably 0.5 to 5% b.w. glycerol acetals;
(e) 0 to 5, preferably 0.1 to 2% b.w. antifoaming agents;
(f) 0 to 5, preferably 0.1 to 2% b.w. thickening agents and/or associative thickeners;
(g) 0 to 5, preferably 0.1 to 2% b.w. dispersing agents,
(h) 0 to 5, preferably 0.1 to 2% b.w. humectants
(i) 0 to 20, preferably 1 to 10% b.w. % b.w. organic solvents under the condition that the amounts add—optionally together with water—to 100% b.w.

The preferred pigment for making lacquers and paints is of course titanium dioxide, however; also all kinds of organic or inorganic pigments as for example compiled in *Lacke and Druck-farben*, U. Zorl, Hrsg., Georg Thieme Verl., Stuttgart, N.Y. (1998) can be incorporated into the products. In a preferred embodiment said dyes are encapsulated for example—but not limited to—in a shell formed from anionic and/or cationic polymers or proteins. Among the resins a base formed from acrylic/styrenic copolymers is typical. Preferred filler is calcium carbonate. The paints according to the present invention may be gloss paints, semi-gloss paints or flat paints.

EXAMPLES

Manufacturing Example M1

Manufacturing of Glycerol Isobutyral

A 50-liter multipurpose reactor equipped with a mechanical stirrer and distillation head with a water separator and nitrogen inlet was charged under nitrogen at 20° C. with 10,195 g (110.8 mol) glycerol, 40.0 g (0.35 mol) phosphoric acid (85% in water) and 9,445 g (131 mol) isobutyraldehyde (the main object of the excess was to fill the dead space in the water separator). The temperature was increased to 130° C. in 3 hours. During the reaction, the water of reaction formed was continuously removed. The reaction was terminated after 2 hours at 130° C. Excess isobutyraldehyde was discharged with a stream of nitrogen, 730 g isobutyraldehyde being recovered. The quantity of water removed amounted to 2200 g. The target product (glycerol acetal of isobutyraldehyde) was obtained in a yield of 16,720 g (=97% of theory) showing an APHA colour of 30.

Example 1

Comparison Example C1

Minimum Film Forming Temperature (MFFT)

The minimum film forming temperature has been determined by adding up to 2% b.w. of glycerol isobutyral or a standard coalescent agent (TMB=trimethyl butyrate) to a standard styrene acrylic composition. The results are compiled in table 1.

TABLE 1

Minimum film forming temperature

| | | Coalescent concentration [° C.] as a function of coalescent concentration | | |
|---|---|---|---|---|
| Example | Coalescent | Control | 1% b.w. | 2% b.w. |
| 1 | Glycerol isobutyral | 15.5 | 10.5 | 5 |
| C1 | Trimethyl butyrate | 15.5 | 10.5 | 6 |

As one can see, the substitution of TMB by glycerol isobutyral shows similar MFFT behaviour and even lower MFFT at higher concentrations.

Example 2

Comparison Example C2

Pendulum Hardness According to Persoz

The pendulum hardness of various films has been determined according to the procedure described in DIN 53157/ASTM D 4366 by adding glycerol isobutyral or TMP at 1 or 2% b.w. (film thickness: 50 micron; styrene-acrylic emulsion with 50% b.w. solids contents). The results are compiled in Table 2:

TABLE 2

Pendulum hardness

| | Coalescent | Pendulum hardness [s] as a function of coalescent concentration | | | | | |
|---|---|---|---|---|---|---|---|
| | Hardness | 1% b.w. | | | 2% b.w. | | |
| Example | after days | 1 | 3 | 20 | 1 | 3 | 20 |
| | Control | 182 | 177 | 156 | 177 | 162 | 165 |
| 2 | Glycerol isobutyral | 158 | 158 | 218 | 157 | 182 | 180 |
| C2 | TMB | 100 | 151 | 160 | 106 | 168 | 182 |

Compared to the standard (TMB) the addition of glycerol isobutyral increases the pendulum hardness of the films also at lower concentrations right from the beginning of the film formation.

Example 3

Comparison Example C3

Scrub Resistance and Gloss

The scrub resistance of various films has been determined according to the procedure described in ASTM D2486 by adding glycerol isobutyral or TMB at 1% b.w. (tests conducted after 7 days from paint drying). Gloss was tested according to ISO 2813/ASTM D523. The results are compiled in Table 3:

TABLE 3

Scrub resistance and gloss

| Example | Coalescent | Scrub resistance [number of cycles] | Gloss [#2] |
|---|---|---|---|
| | Control | 375 | 329 |
| 3 | Glycerol isobutyral | 500 | 31.2 |
| C3 | Trimethyl butyrate | 450 | 30.5 |

Example 4

Comparison Example C4

Semi-Gloss and Flat Paint

A semi gloss paint (3% b.w. solvent, 38% b.w. resin content with 50% b.w. solids) and a flat paint (2% b.w. solvents, 10% resin content with 50% b.w. solids) were prepared using glycerol isobutyral (GIB) or butylglycol (BG) as coalescent agents/solvents. The results are compiles in Table 4:

TABLE 4

Semi-gloss and flat paints

| | Semi-gloss paint | | | Flat paint | | |
|---|---|---|---|---|---|---|
| Performance | Control | GIB | BG | Control | GIB | BG |
| Aspect (liquid paint) | ok | ok | ok | ok | ok | ok |
| Film (draw-down) 100 microns | | | | | | |
| Gloss (20°), 24 h | 2.1 | 2.0 | 2.2 | | | |
| Gloss (60°), 24 h | 11.4 | 9.8 | 10.9 | 2.8 | 2.8 | 2.9 |
| Gloss (20°), 3 d | 2.0 | 2.0 | 2.2 | | | |
| Gloss (60°), 3 d | 11.2 | 9.7 | 10.8 | | | |
| Viscosity* [mPas] | | | | | | |
| immediately | 9650/11900 | 3310/3900 | 2550/3240 | 8440/12060 | 4810/7180 | 4180/6000 |
| after 10 d, 50° C. | 877/10640 | 4370/5800 | 2859/3480 | | | |
| Density [g/cm$^3$] | 1.241 | 1.277 | 1.269 | | 1.674 | 1.655 |

*Brookfield RVT Viscosimeter, spindle 4, 20/10 rpm, 25° C.)

Example 5

Composition of a Semi-Gloss Paint

Table 5 reflects a typical composition of a semi-gloss paint comprising glycerol isobutyral as a solvent/coalescent agent.

TABLE 5

Semi-gloss paint

| Component | Function | Concentration [% b.w.] | Quantity [g] |
|---|---|---|---|
| Hydropalat ® 204 B | Dispersing agent | 1.0 | 6.0 |
| Disponil ® 15B | Humectant | 0.15 | 0.9 |
| HMPNa | | 0.1 | 0.6 |

TABLE 5-continued

Semi-gloss paint

| Component | Function | Concentration [% b.w.] | Quantity [g] |
|---|---|---|---|
| Dehydran ® 111 | Anti-foaming agent | 0.3 | 1.8 |
| Titanium dioxide | Pigment | 18.35 | 110.1 |
| Calcium carbonate | Filler | 5.45 | 32.7 |
| Natrosol ® 250 | Thickening agent | 0.1 | 0.60 |
| Natrosol ® plus | Thickening agent | 0.15 | 0.90 |
| DSX ® 1514 | Associative thickener | 1.0 | 6.0 |
| Bisomer ® Amine D 700 | Amine-pH adjuster | 0.2 | 1.20 |
| Acrylic/Styrene | Resin | 40.0 | 240.0 |
| Loxanol ® C4* | Coalescent agent | 2.0 | 12.0 |
| | Water | ad 100 | ad 100 |

What is claimed is:

1. A method of making aqueous paints comprising adding one or more glycerol acetals selected from the group consisting of glycerol isobutyral, glycerol 2-ethylhexanal, glycerol furfural, and glycerol benzal, in amounts from about 0.1 to 10% by weight, based on the final composition, effective to serve as coalescent agents, to an aqueous paint base, wherein the addition of one or more glycerol acetals increases pendulum hardness, scrub resistance, and gloss at lower concentrations when compared to a comparative coalescent agent that does not contain glycerol acetals.

2. An aqueous paint comprising:
(a) one or more pigments and/or dyes,
(b) one or more resins,
(c) one or more fillers,
(d) one or more glycerol acetals selected from the groups consisting of glycerol isobutyral, glycerol 2-ethylhexanal, glycerol furfural, and glycerol benzal, to serve as coalescent agents, and
(e) water,
wherein the addition of one or more glycerol acetals increases pendulum hardness, scrub resistance, and gloss at lower concentrations when compared to a comparative coalescent agent that does not contain glycerol acetals.

3. The aqueous paint of claim 2, further comprising one or more antifoaming agents, and/or thickening agents, and/or associative thickeners, and/or dispersing agents, and/or humectants, and/or organic solvents.

4. The aqueous paint of claim 3 comprising:
(a) 5 to 25% by weight of one or more pigments and/or dyes;
(b) 10 to 5% by weight of one or more resins;
(c) 5 to 50% by weight of one or more fillers;
(d) 0.1 to 10% by weight of one or more glycerol acetals;
(e) 0 to 5% by weight of one or more antifoaming agents;
(f) 0 to 5% by weight of one or more thickening agents and/or associative thickeners;
(g) 0 to 5% by weight of one or more dispersing agents;
(h) 0 to 5% by weight of one or more humectants; and
(i) 0 to 20% by weight of one or more organic solvents;
provided that the amounts add up, together with water, to 100% by weight.

5. The aqueous paint of claim 2, wherein said aqueous paint is a gloss paint, a semi-gloss paint or a flat paint.

* * * * *